April 19, 1960  W. BORNEMANN  2,933,030
PHOTOGRAPHIC PRINTING APPARATUS
Filed April 12, 1956  7 Sheets-Sheet 2
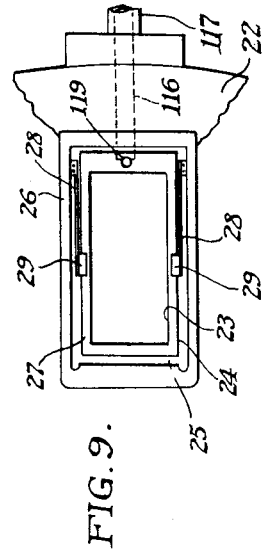
FIG. 9.
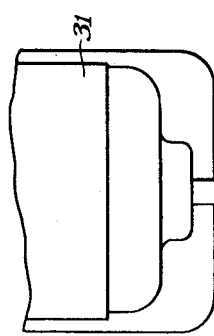
FIG. 3.
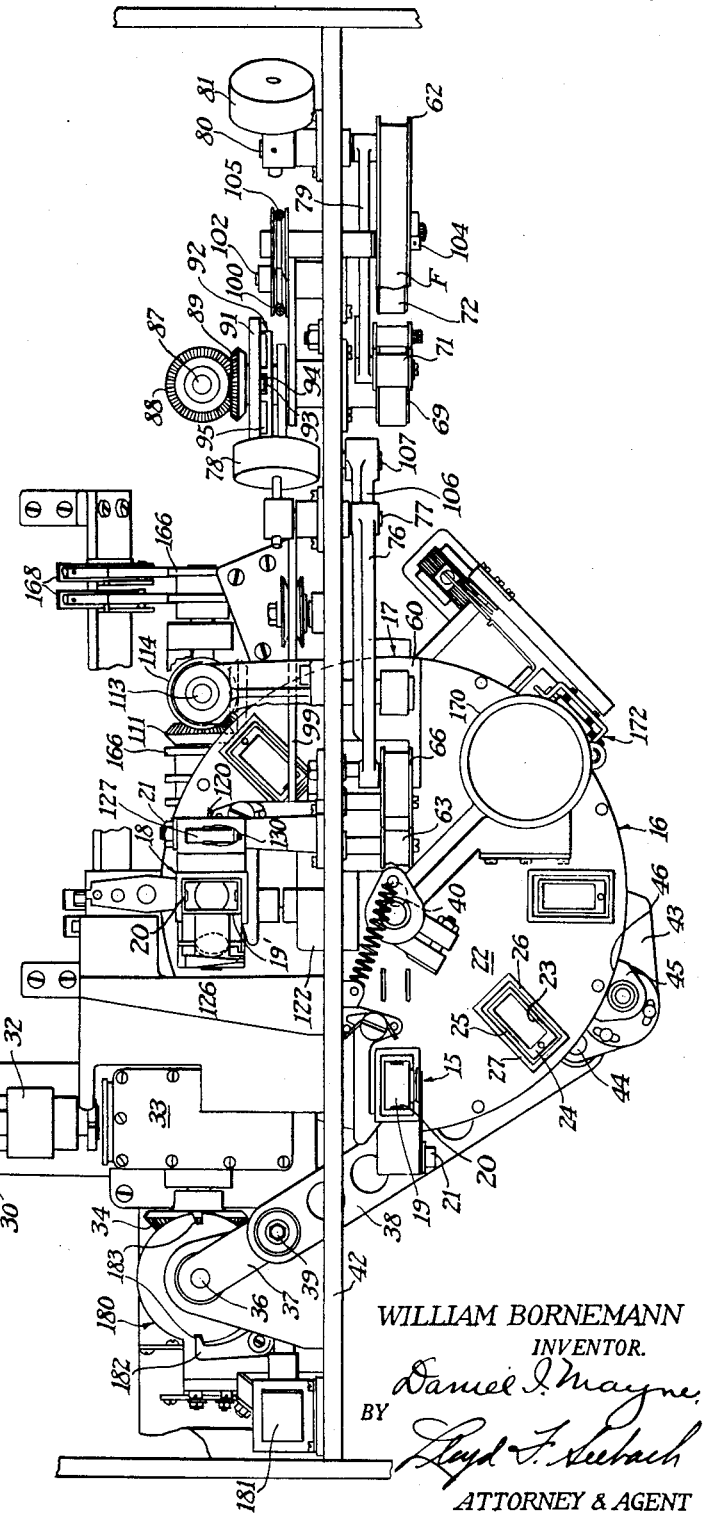
WILLIAM BORNEMANN
INVENTOR.
BY Daniel I. Mayne
Lloyd F. Seebach
ATTORNEY & AGENT

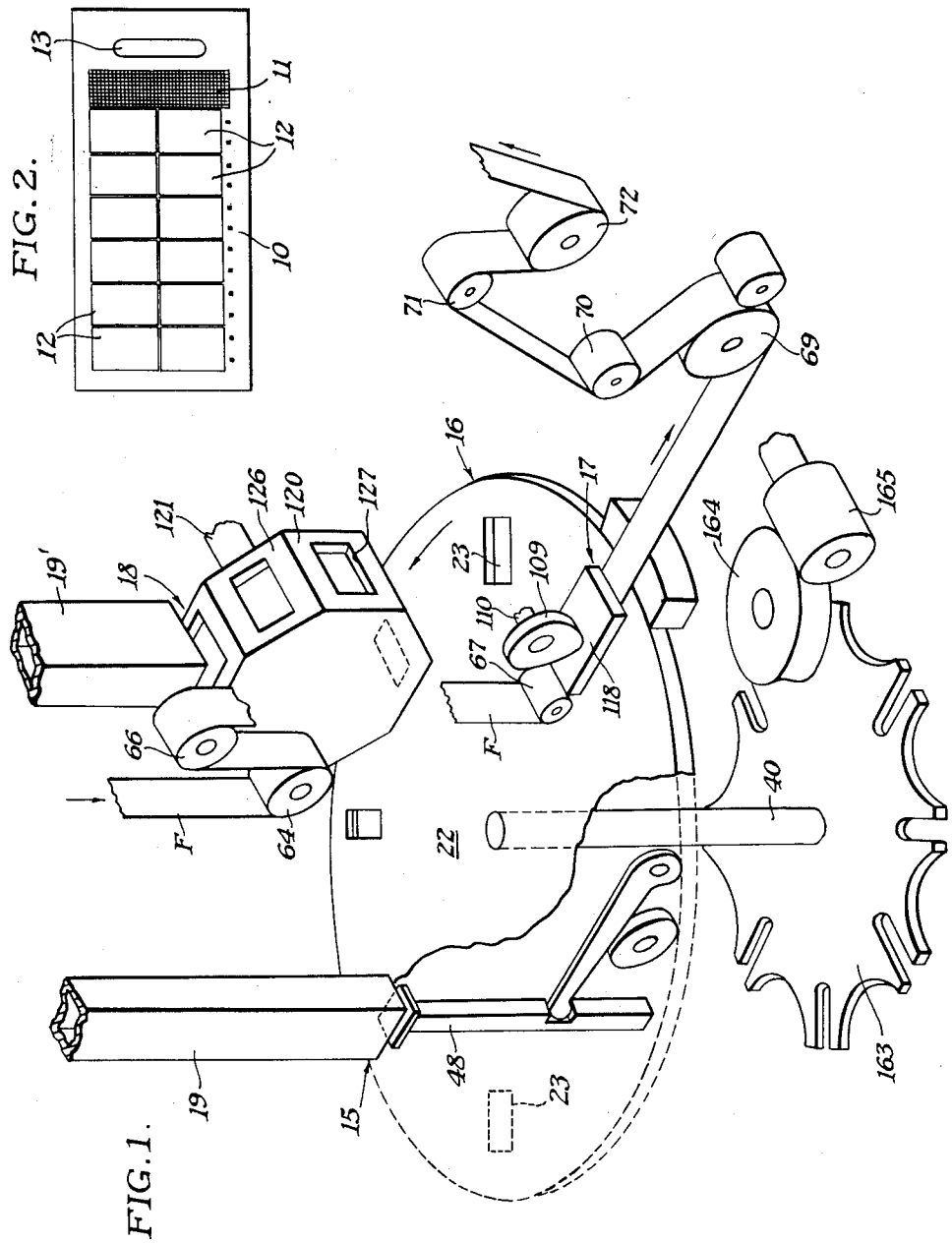

WILLIAM BORNEMANN
INVENTOR.

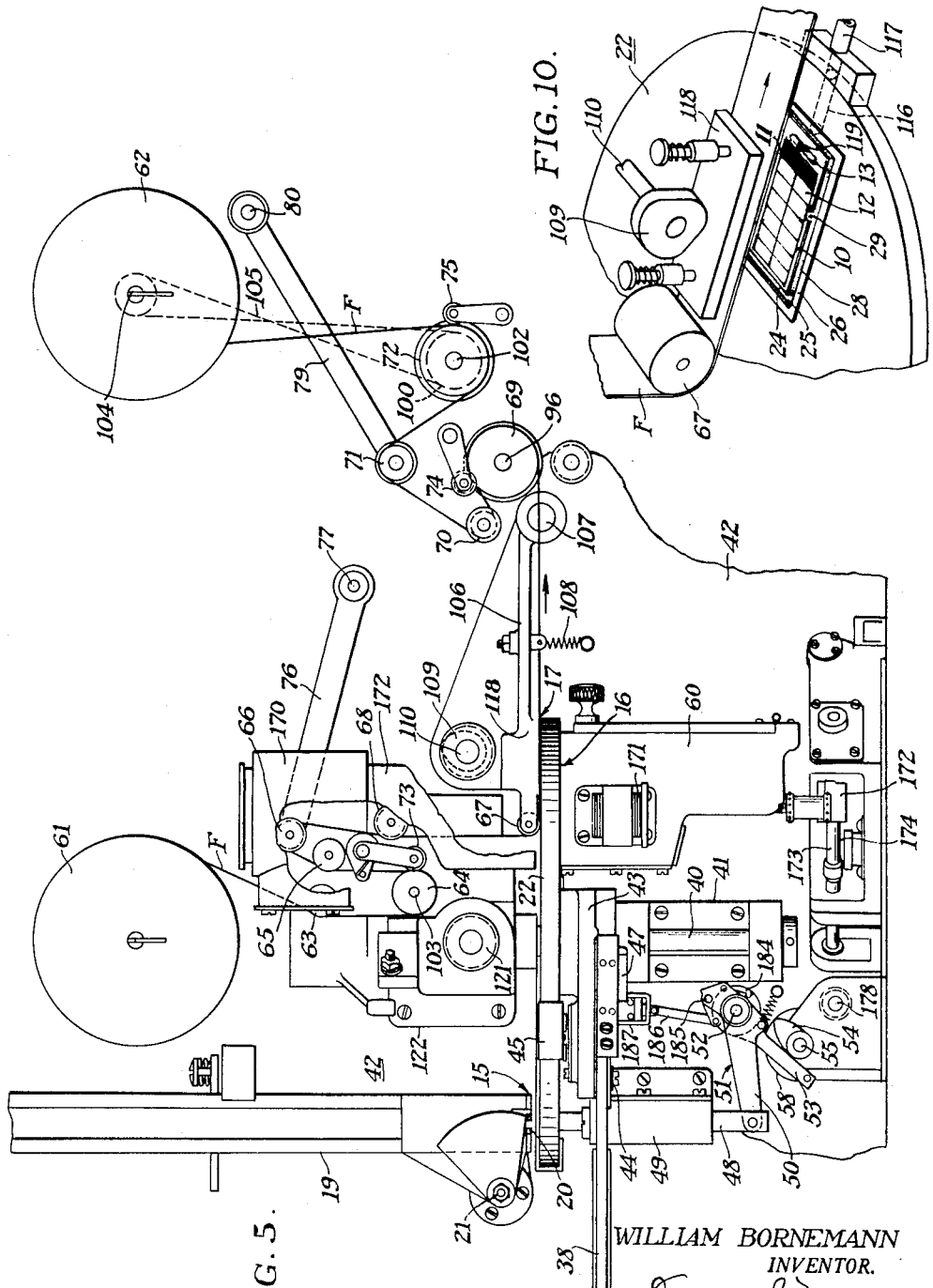

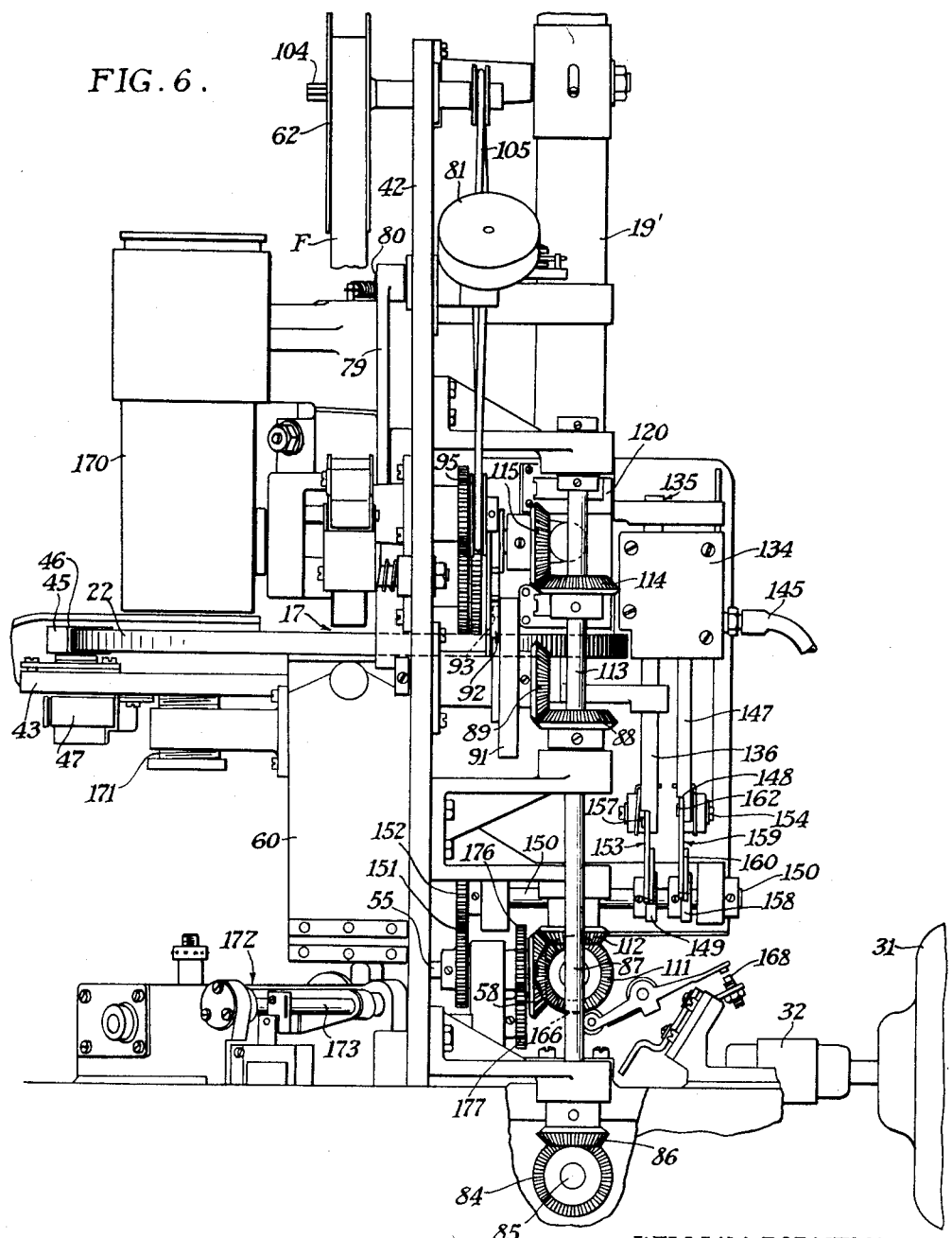

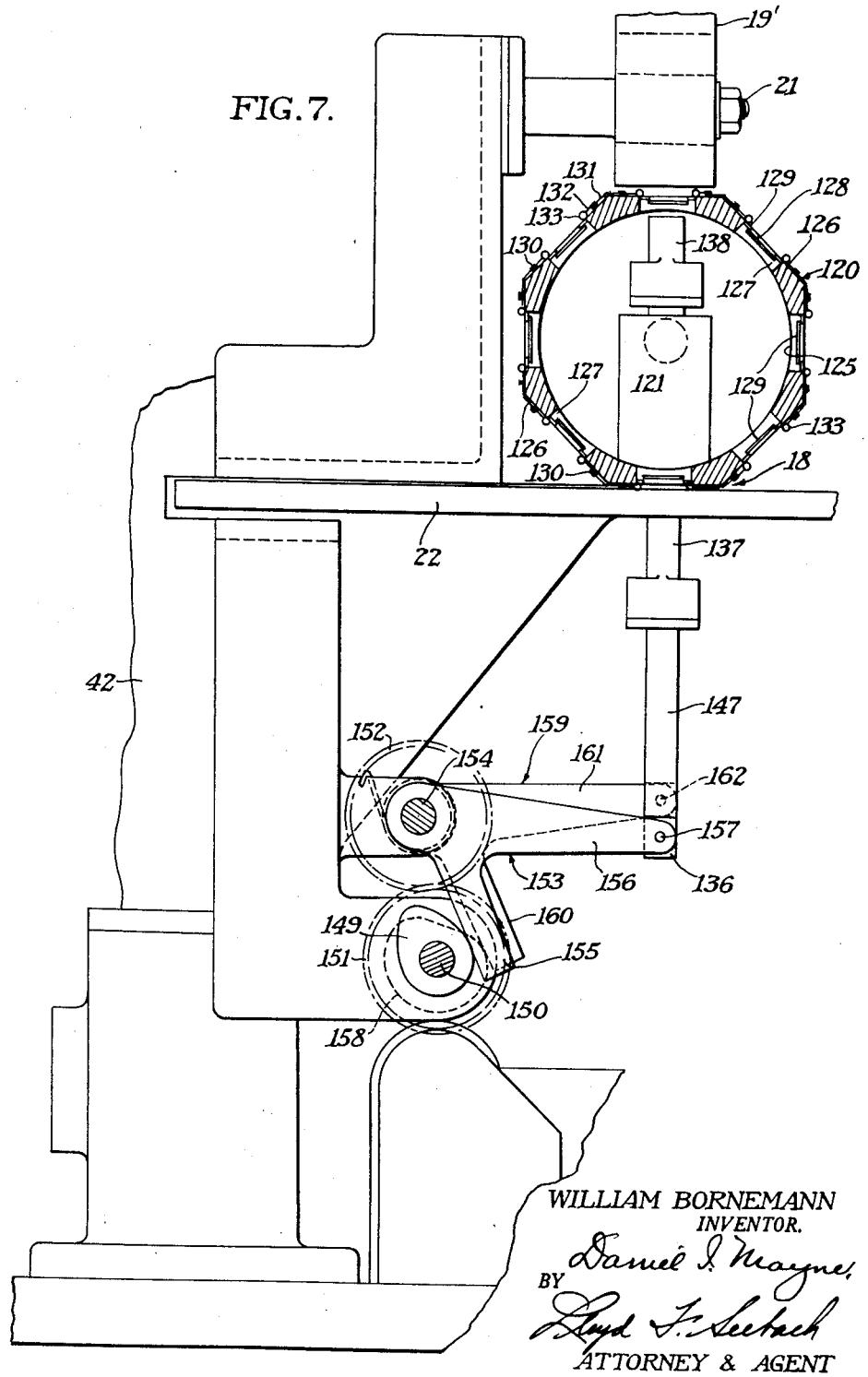

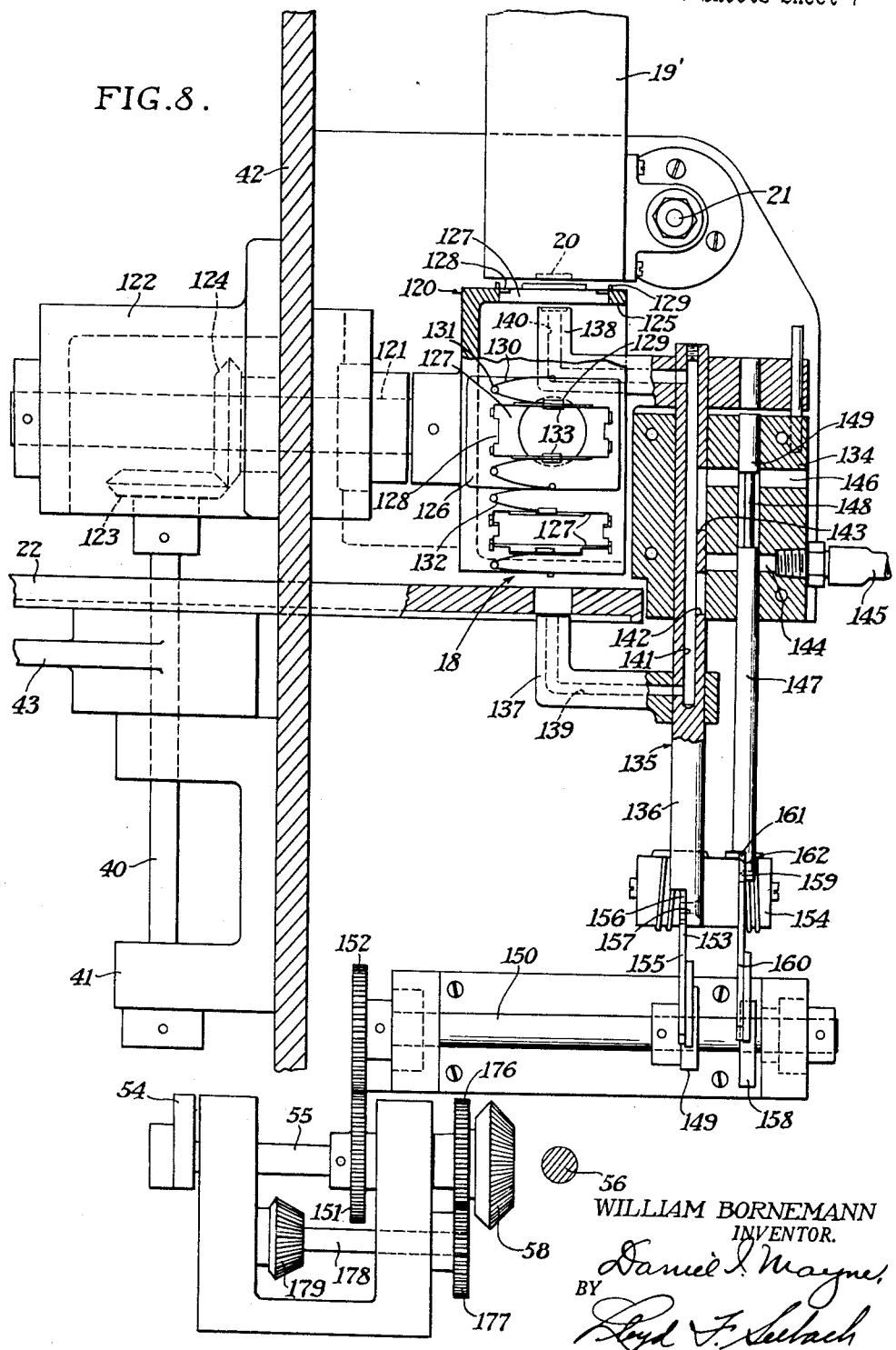

United States Patent Office 2,933,030
Patented Apr. 19, 1960

2,933,030

PHOTOGRAPHIC PRINTING APPARATUS

William Bornemann, Rochester, N.Y., assignor to Eastman Kodak Company, Rochester, N.Y., a corporation of New Jersey Application April 12, 1956, Serial No. 577,710

10 Claims. (Cl. 95—75)

The invention relates to photographic apparatus and more particularly to apparatus for printing on a strip of light-sensitive material the images carried by discrete photographic elements which are successively moved into and out of an exposure station.

In photographic apparatus for making prints from either a negative or a positive transparency by means of contact printing, the films or film and paper, are placed one over the other in intimate contact and in position with respect to a light source for an exposure interval. Usually the film and paper are of such size that they can be readily handled during the steps of printing and processing. The invention is, however, concerned with the printing from relatively small pieces of film which are approximately five-eighths of an inch wide and one and one-quarter inches long. In this instance the size of the film prohibits their being handled as most other film and for this reason it becomes necessary to eliminate any human handling insofar as possible.

Since it is impractical to handle these small size photographic elements discretely, they are handled in groups by means of a stick or holder which permits the photographic elements to be transported from one type of machine to another and also provides a means for inserting said elements into a receptacle or removing them therefrom. In addition, because of the size of the negative or positive film, the film is printed on a continuous strip which can then be readily handled for the purpose of processing.

In the present invention, the discrete elements are loaded in a supply station or hopper. The elements are removed successively from the bottom of the supply station and deposited over one of a number of apertures in a carrier which is intermittently rotated. The carrier moves each element into an exposure station and then into a position with respect to a receiving hopper or station. In the latter position, the element is moved onto a rotatable member which inverts each element before it is ultimately inserted in the receiving station. Since the film is a continuous strip and must be moved through the exposure station in very exact increments corresponding to the length of the element, it is necessary to provide an advancing means for the film strip which relieves the measuring roller of any load imposed thereon by the film. The film strip is moved intermittently through the exposure station during the interval the carrier is moved to position the next element to be printed in the exposure station. During the interval the film and carrier are stationary, the element and film are clamped together and the light source is energized to make the exposure. During this same interval, an element is removed from the supply hopper and positioned on the carrier and the element aligned with the rotatable member or drum is positioned thereon while the inverted element is, at the same time, inserted in the receiving hopper or station. With inversion of each element at the receiving station, that is from a face-down to a face-up position, the elements then present the same approach aspect relative to each other in the receiving hopper as they did when inserted in the supply station.

The primary object of the invention is, therefore, to provide a photographic printing apparatus in which the elements to be printed are moved successively from a supply station to a carrier which, in turn, moves each element intermittently into an exposure station and then into a position with respect to an inverting means which is arranged between the carrier and the receiving station.

Another object of the invention is to provide a photographic printing apparatus in which the elements to be printed and the light-sensitive material therefor are advanced intermittently and simultaneously into the exposure station.

Still another object of the invention is to provide a photographic printing apparatus in which the means for advancing the light-sensitive material comprises three driven members, each of which advances different equal lengths of the light-sensitive material, for eliminating any load imposed on the central or measuring roller by either the supply or take-up source for the light-sensitive material.

Yet another object of the invention is to provide a photographic printing apparatus in which each discrete photographic element which is moved to the receiving station is first positioned on a rotatable member which then inverts each of the elements before insertion into the receiving station so that said elements then present the same approach aspect relative to each other as when inserted in the supply station.

A further object of the invention is to provide a photographic printing apparatus in which a carrier for the elements, the inverting means for the elements and the light-sensitive material are moved and advanced intermittently and simultaneously whereas, during the interval the foregoing are stationary, said elements are positioned on the carrier, the element in the exposure station is clamped to the light-sensitive material, the light source is energized for the necessary exposure time, the clamping means is released, the element on the carrier which is positioned with respect to the receiving station is moved onto the inverting means, and the inverted element is inserted into the receiving station.

And still another object of the invention is to provide a photographic apparatus for printing on a light-sensitive material photographic elements which are presented successively into the exposure station, said apparatus handling and moving said elements and light-sensitive material in proper timed and sequential relation to provide a completely automatic operation.

Other objects and advantages will be apparent to those skilled in the art by the description which follows.

Reference is now made to the accompanying drawings wherein like reference numerals designate like parts and wherein:

Fig. 1 is a diagrammatic perspective view showing the relative relation of the primary elements comprising the apparatus embodying the invention;

Fig. 2 is an enlarged detail plan view of one of the photographic elements to be handled and printed by the apparatus embodying the invention;

Fig. 3 is a plan view of the printer showing the relation of the various elements with respect to the exposure station;

Fig. 5 is a partial front elevation view showing the supply station and particularly the path of the light-sensitive material and the reciprocating means for the supply station;

Fig. 6 is a side elevation showing the relation of the various elements with respect to the vertical mounting plate;

Fig. 7 is a front elevation view of the inverting mechanism arranged between the carrier for the elements and the receiving station and of the reciprocating means for removing said elements from the carrier and for inserting said elements in said receiving station;

Fig. 8 is a detail vertical section through the inverting means shown in Fig. 7 and showing the valve control for use in conjunction with the reciprocating member;

Fig. 9 is a detail plan view of the carrier and showing the arrangement for supporting the photographic element with respect to the apertures in said carrier; and Fig. 10 is a detail perspective view of the carrier shown in Fig. 9 and showing the relation of the light-sensitive material and the platen thereto.

Figure 4:
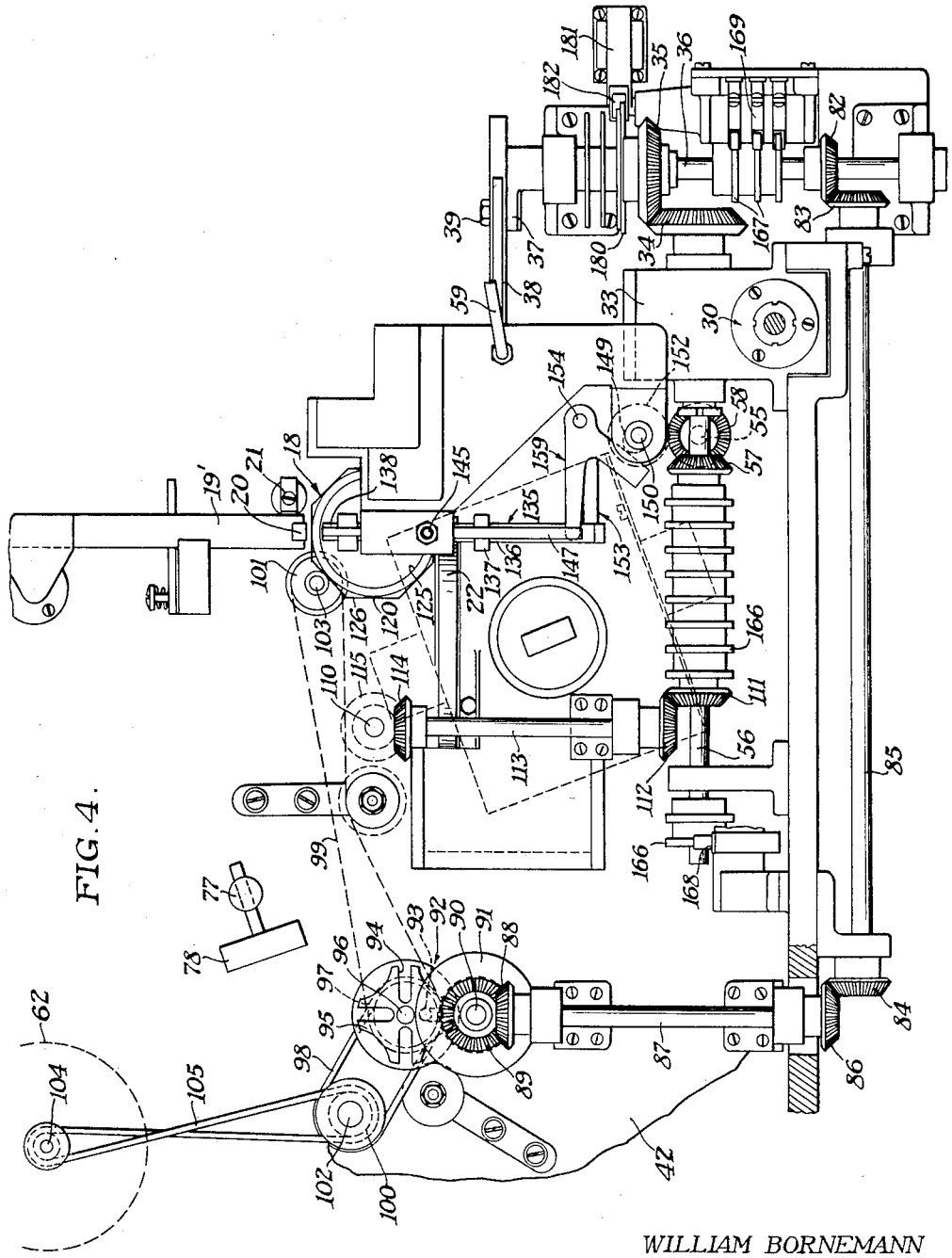
Fig. 4 is a rear elevation view showing the intermittent drive for the light-sensitive material, the drives for the various control shafts and the reciprocating means associated with the receiving station.

In the illustrated embodiment of the invention, the photographic elements 10, which can be either a negative or a positive, are relatively small, being of the order of approximately five-eighths of an inch in width and one and one-quarter inches in length. Such elements comprise a code area 11 and an image area 12 and are provided with a transverse aperture 13 adjacent one end thereof, as shown in Fig. 2. The code area 11 comprises a minimum of ten lines of code which is the equivalent of two transverse image areas or any number of lines of code between ten and seventy so that in the latter case, the element would contain no image area. The image area 12 comprises a maximum of twelve document images and a minimum of two document images in which case the code area 11 may comprise between fifty and sixty lines of code.

The apparatus about to be described provides for making either positive or negative duplicates of elements 10, depending on whether the elements to be printed are negatives or positives, by means of contact printing. As pointed out hereinbefore, since the elements 10 are relatively small, it is extremely difficult to handle them individually for any purpose whatsoever. As a result, the elements are handled by means of a "stick" which is inserted in aperture 13 and which permits a large number of elements 10 to be transported, handled or manipulated as a unit or group.

By such means a group of elements 10 are positioned in supply station or hopper 15 for printing. A carrier 16 is utilized to transport the elements 10, when positioned thereon from supply station 15 into exposure station 17 and into a position beneath and aligned with receiving station or hopper 18.

Supply station 15 and receiving station 18 comprises rectangular open-end receptacles 19 and 19' having lips 20 at the bottom end for supporting the stack of elements. Receptacles 19 and 19' are pivotally mounted at 21 for movement to a position in which elements 10 can be readily inserted or removed therefrom by means of the "stick" described hereinabove.

Carrier 16 comprises a disc 22 which is provided with a plurality of substantially rectangular apertures 23, as shown in Figs. 3 and 9, each of said apertures being of a size to provide exposure of the code area 11 and image area 12. As shown in Fig. 9, each of said apertures 23 is surrounded by a land 24 which conforms to the outer dimensions of element 10 and, in turn, is surrounded by a recess 25. Gasket 26 surrounds recess 25 and a gasket 27 of the same thickness is applied over land 24. Resilient fingers 28 are mounted at one end within recess 25 and extend along the sides thereof, the free ends being provided with portions 29 which overlie land 24 and serve to hold the element 10 in position on disc 22 in a manner to be described hereinafter.

The drive means 30 comprises motor 31 which is connected by coupling 32 to reduction unit 33, as shown in Figs. 3 and 4. By means of bevel gears 34 and 35, shaft 36 is rotated at the desired speed. Shaft 36, as shown in Fig. 4, carries arm 37 to which link 38 is pivotally connected at 39, as shown in Fig. 3. Disc 22 is mounted on and keyed to shaft 40 which is journaled in bearing 41 secured to mounting plate 42. Arm 43 is rotatably mounted on shaft 40 between bearing 41 and the underside of disc 22. The outer end of arm 43 is pivotally connected to link 38 at 44 so that arm 43 is oscillated about shaft 40 as arm 37 is rotated. Shoe 45 is eccentrically mounted on arm 43 and has a curved surface 46 corresponding to the periphery of disc 22. A solenoid 47 is coupled to shoe 45 so that upon movement of link 38 toward disc 22, shoe 45 is maintained in frictional engagement with disc 22 to advance said disc the required distance to move the next and succeeding apertures therein into alignment with the different stations. Upon movement of link 38 in the opposite direction, solenoid 47 is deenergized and shoe 45 is released from engagement with disc 22 whereby no movement is imparted to said disc. The rotation of shaft 36 is, therefore, continuous and the movement imparted to disc 22 is intermittent.

Directly below disc 22 and aligned with the open end of supply hopper 19, a plunger 48 is slidably mounted in bracket 49 which is secured to plate 42. The lower end of plunger 48 is pivotally connected to arm 50 of bell-crank lever 51 which is rotatably mounted on shaft 52 journaled in plate 42. The other arm 53, as shown in Fig. 5, of lever 51 serves as a follower for cam 54 and is rotatably mounted on shaft 52 independently of arm 51 for a purpose disclosed hereinafter. Reduction unit 33 drives shaft 56, and bevel gear 57 fixed thereto drives bevel gear 58 which is fixed to shaft 55. The relation between cam 54 and plunger 48 is such that plunger 48 is moved through aperture 23 during each interval that disc 22 is stationary. Plunger 48 is provided with a blind central opening having ports arranged with respect to a port in bracket 49, the latter port being connected to vacuum line 59 shown in Fig. 4 and the arrangement of said ports being similar to those shown in Fig. 8 and described hereinafter. As plunger 48 is, therefore, moved in an upward direction toward the lowermost element in hopper 19, the vacuum is applied and serves to retain the element being withdrawn on the plunger as the element is bowed past the supporting lips 20 of the hopper and positioned on disc 22 in proper relation over the aperture 23 therein. The intermittent movement of disc 22 then ultimately moves the withdrawn element into position with respect to exposure station 17.

At exposure station 17, the light-sensitive material F, which can be either positive or negative film depending on whether elements 10 are negative or positive, is positioned over the element moved into the exposure station for making a contact print thereof. A lamp and suitable condenser lens system are mounted in lamp housing 60 which is mounted on plate 42 immediately below and aligned with exposure station 17. The light sensitive material F is withdrawn from a supply reel 61 and taken up on take-up reel 62. Between reels 61 and 62, the light-sensitive material F is guided by fixed roller 63, withdrawn from said supply reel by driven roller 64, passes over guide roller 65, loop forming roller 66, guide rollers 67 and 68 and into exposure station 17. The light-sensitive material is withdrawn from exposure station 17 by driven roller 69 and then passes around guide roller 70, loop-forming roller 71, and driven roller 72 to take-up reel 62. Each of driven rollers 64, 69 and 72 have a spring-biased pressure roller 73, 74 and 75, respectively, associated therewith. Loop forming roller 66 is rotatably mounted on arm 76 which is carried by shaft 77 and which is balanced against weight 78 also carried by shaft 77 on the other side plate 42. In a like manner, roller 71 is rotatably mounted on arm 79 which is carried by shaft 80 and balanced by weight 81.

In order to relieve any load imposed on the light-sensitive material at the exposure station as it is drawn therethrough by driven roller 69, driven roller 64 is driven at a speed greater than roller 69 and driven roller 72 is driven at a speed less than that of roller 69. Roller 69 draws a fixed and predetermined amount of material F through exposure station 17 as it is intermittently rotated. Roller 64 withdraws an amount of material F from reel 61 which is greater than the predetermined amount required by roller 69 and the difference in these lengths is taken up by roller 66; that is, with each increment of advance of material F, the loop maintained by roller 66 becomes slightly larger. On the other hand, since driven roller 72 is driven at a speed less than that of roller 69, the loop maintained by roller 71 also increases in size because the amount removed from the loop is less than that fed into it by roller 69. With this arrangement the two loops increase in size and the tension on the film between rollers 66 and 71 remains constant so that the amount of light-sensitive material withdrawn through exposure station 17 with each intermittent movement of roller 69 is constant and within very close limits.

The means for rotating rollers 64, 69 and 72 intermittently comprises bevel gear 82 on shaft 36 which, in turn, by means of bevel gears 83 and 84 on shaft 85 rotates bevel gear 86 on shaft 87. Bevel gear 88 which is fixed to the other end of shaft 87 rotates bevel gear 89 on shaft 90 to which driving disc 91 of Geneva movement 92 is secured. Driving disc 91 carries the driving pin 93 which engages one of the slots 94 in driven disc 95 with each revolution of disc 91 to impart an intermittent rotary movement to shaft 96 and to driven roller 69 which is also mounted on shaft 96 on the front side of plate 42, see Figs. 3, 5 and 6. Shaft 96 also has secured thereto pulley 97 which by means of belts 98 and 99 transmits the intermittent rotary movement of shaft 96 to pulleys 100 and 101 which are fixed to shafts 102 and 103 on which driven rollers 72 and 64 are, respectively, mounted. This same movement is transmitted to spindle 104 on which reel 62 is mounted by means of belt 105. The relation between pulleys 97, 100 and 101 is such that the desired speed of shafts 96, 102 and 103 is obtained for the purpose described hereinabove. The relation between the Geneva movement 92 for advancing the light-sensitive material and the intermittent drive for disc 22 is such that the material advance also occurs during the interval disc 22 is being moved.

The means for clamping material F and element 10 together in the exposure station during printing comprises a bracket 106 which is pivotally mounted on plate 42 at 107 and which carries guide roller 67 at the opposite end thereof. The tension of material F as applied to guide roller 67 tends to lift bracket 106 and is overcome by spring 108 fixed to said bracket, as shown in Fig. 5. In its normal position, bracket 106 assumes a position which permits disc 22 and elements 10 to move thereunder as the exposed material F is moved out of the exposure station by driven roller 69. During the interval disc 22 and material F is stationary, cam 109 on shaft 110 moves bracket 106 into intimate contact with disc 22 to clamp element 10 in exposure station 17 and material F together for the exposure time. Cam 109 is rotated by means of bevel gear 111 on shaft 56 which meshes with bevel gear 112 on shaft 113, shaft 113 carrying bevel gear 114 which meshes with bevel gear 115 on shaft 110 and on the rear side of plate 42.

As shown in detail in Figs. 9 and 10, when an element 10 is positioned in exposure station 17 by disc 22, a radial aperture 116 connecting recess 25 with the periphery of disc 22 is aligned with vacuum line 117. After material F and element 10 have been clamped together by platen 118 on bracket 106, the vacuum is then applied to further insure intimate contact thereof. In these detail views, pin 119 is disclosed for the purpose of engaging aperture 13 in element 10 to locate said element with respect to apertures 23.

After exposure, element 10 is moved by disc 22 into position with respect to receiving station 18. Between disc 22 and the open end of receiving hopper 19', a drum 120 is rotatably mounted on the rear side of plate 42, said drum being secured to shaft 121 which is journaled in bracket 122 on the front side of plate 42. Shaft 121 is driven intermittently with disc 22 by means of bevel gear 123 on shaft 40 and bevel gear 124 on shaft 121, as shown in Fig. 8.

Drum 120, as shown in Figs. 1, 4, 7 and 8 is provided with an open end 125 and is octagonal in shape, each of sides 126 thereof being provided with an aperture 127. As shown in Fig. 8, each of said apertures 127 is provided with extensions 128 for supporting the element marginally in the plane of the side and with extensions 129 normal to the side for locating the element. Springs 130 are fixed to drum 120 at 131 and have legs 132 which are either formed into cylindrical coils or provide for rotatably supporting a small roller on the end thereof, said coils or rollers being designated by the numeral 133 in Fig. 8. Coils or rollers 133 extend through an aperture in extensions 129 and partially overlie element 10, when positioned on said drum and with respect to aperture 127, to retain said element and to prevent its falling off said drum as it is moved from disc 22 to hopper 19'.

To the right of drum 120, as shown in Fig. 8 bracket 134 carries the reciprocating member 135 for simultaneously removing the element 10 on disc 22 and positioning it on drum 120 and removing the inverted element 10 on drum 120 and inserting it into the open end of receiving hopper 19'. Reciprocating member 135 comprises a plunger 136 having a lower extending portion 137 arranged below disc 22 and an upper extending portion 138 arranged within drum 120 and below receiving hopper 19'. Both portions are provided with an aperture 139 and 140, respectively, which connect with a central aperture 141 which, in turn, is connected by apertures 142 and 143 to a vacuum aperture 144 to which vacuum line 145 is connected and an exhaust aperture 146, respectively. A control plunger 147 is also mounted in bracket 134 and is provided with an undercut portion 148.

Plungers 136 and 147 are reciprocated in a predetermined relation so that the vacuum applied to portions 137 and 138 cooperates therewith only during the interval the elements are being moved from disc 22 and drum 120. In other words, the vacuum need only be effective during the movement of portions 137 and 138 in an upward direction. As plunger 136 moves upward, aperture 142 becomes aligned with aperture 144. At the same time, plunger 147 moves downward whereby portion 149 closes aperture 146 and portion 148 permits vacuum line 145 to be connected to aperture 144. At the instant aperture 146 is fully closed and aperture 144 is fully open, portion 137 is in engagement with the element on disc 22 and portion 138 is in engagement with the element on drum 120 which is aligned with the open end of hopper 19'. The elements being moved are, therefore, moved by portions 137 and 138 and retained thereon by the vacuum. Before portions 137 and 138 reach their maximum upward travel, plunger 147 has started to move upwardly to close aperture 144 and open aperture 146. At the instant portions 137 and 138 reverse their movement the vacuum is no longer effective due to apertures 139, 140, 141, 143 and 146 providing a path to the atmosphere, and the elements are then retained on drum 120 by coils 133 and in hopper 19 by lips 20.

The reciprocating means for plunger 136 comprises a cam 149 which is mounted on shaft 150, said shaft being driven from shaft 55 by gears 151 and 152, as shown in Fig. 8, said shaft 55 being, in turn, rotated by gear 58 which meshes with gear 57. The movement of cam 149 is imparted to plunger 136 by bell-crank lever 153 which is pivotally mounted at 154 and which is provided with an arm 155 serving as a follower on cam 149 and an arm 156 pivotally connected to plunger 136 at 157, as shown in Fig. 7. A cam 158 also mounted on shaft 150 is utilized for imparting the properly timed and sequential reciprocating motion to plunger 147 by means of a second bell-crank lever 159 which is also pivotally mounted at 154 and which has a follower arm 160 and an arm 161 pivotally connected to plunger 147 at 162.

In making contact prints, the emulsion side of the negative or positive film is placed in contact with the emulsion side of the positive or negative film on which the print is to be made. Accordingly, it is necessary to place elements 10 in supply magazine 19' with the emulsion side up so that when the elements are positioned in exposure station 17 by disc 22 the proper surface is presented with respect to the light-sensitive material F. When elements 10 are positioned beneath drum 120 by disc 22, it is necessary to invert the element by means of said drum in order that the elements, when placed in receiving hopper 19', present the same approach aspect relative to each other as they did when inserted in supply hopper 19. Drum 120, therefore, provides a means for inverting elements 10 prior to their insertion into receiving hopper 19.

As shown in Fig. 1, carrier 16 can also be intermittently rotated by a conventional Geneva movement comprising slotted plate 163 which is keyed to shaft 40 and a driving pin, not shown, on the underside of worm wheel 164, said worm wheel being driven by worm 165 on the shaft of motor 31 or from reduction unit 33 depending on the desired or required speed.

On shaft 56, between bevel gears 57 and 111 and beyond bevel gear 111, as shown in Fig. 4, a plurality of switch actuating cams 166 are arranged in spaced relation therealong. A group of similar cams 167 are also arranged along shaft 36. These cams actuate switches 168 and 169 respectively, which are positioned alongside said cams, as shown in Fig. 6, and serve to energize the various solenoids and the light source in housing 60 in a proper timed and sequential relation to the movement of disc 22 and drum 120.

For the purpose of reading the code area 11, a housing 170 which contains a suitable light source and lens system is pivotally mounted on plate 42 above bracket 122 for movement over the aperture 23 just ahead of exposure station 17, as shown in Fig. 3. A projection lens 171 is mounted below disc 22 on lamp housing 60 for projecting the code images onto an array of light-sensitive cells arranged therebeneath, said cells being arranged in a housing which is broadly designated by the numeral 172 in Figs. 3, 5 and 6 and which is movable along the spaced rods 173 by the screw 174. With respect to Figs. 4 and 8, gear 57 on shaft 56 drives bevel gear 58 and by means of spur gears 176 and 177 which are fixed to shafts 55 and 178, respectively, bevel gear 179 is rotated and meshes with a mating gear, not shown, for rotating screw 174. Between the mating gear and screw 174 a clutch and reversing mechanism, not shown, is arranged for permitting screw 174 to be rotated in either direction so that housing 172 can be properly positioned with respect to any line of code in code area 11 on element 10. The location of housing 172 and the cells therein with respect to the line of code to be read is manually controlled by the operator.

For the purpose of making more than one print of the element 10 which has been positioned in the exposure station 17, a half-revolution clutch 180 is arranged on shaft 36 between gear 35 and arm 37. Upon energization of solenoid 181 by the operator, pawl 182 is moved against the clutch to engage the first of two slots 183, said slots being arranged to arrest arm 37 in either of the extreme positions in which arm 37 and link 38 are aligned, one of these extreme positions being shown in Fig. 3. Since disc 22 will then be locked against movement, it is necessary to prevent any further removal of elements 10 from supply magazine 19 to disc 22. As stated hereinbefore, arms 50 and 53 comprising bell crank lever 51, as shown in Fig. 5, are independently mounted on shaft 52. By means of pawl 184 which is pivotally mounted on arm 50 at 185, the two arms are normally interconnected to form a single unit. Pawl 184 is connected by link 186 to solenoid 187 which, when energized with solenoid 181, by means of said link disconnects pawl 184 on arm 50 from arm 53 so that arm 50 cannot be actuated even though cam 54 continues to be rotated and actuates arm 53. As a result, plunger 48 is not reciprocated and no withdrawal of elements 10 from supply hopper 19 occurs. When solenoids 181 and 187 are deenergized, pawls 182 and 184 assume their normal position whereby disc 22 is again intermittently rotated and plunger 48 is intermittently reciprocated by bell-crank lever 51.

From the foregoing description, it is evident that disc 22 together with the arrangement for retaining the elements 10 thereon and with respect to apertures 23 provides a carrier for moving said elements from supply hopper 19 into exposure station 17 and then into a position with respect to receiving station 18. The single drive means or motor 31 is operatively connected to carrier 16 by an intermittent drive comprising essentially arm 37, link 38, arm 43 and shoe 45. The drum 120, which provides for inversion of each element 10 before it is inserted in hopper 19', is also intermittently rotated by the same drive as carrier 16 and in synchronism therewith. The cams 54, 149 and 158 which actuate plungers 48, 136 and 147 are continuously rotated by motor 31 and serve as a control means for actuating said plungers in proper timed and sequential relation with respect to the interval that disc 22 and drum 120 are stationary. Likewise cam 109 provides the control means for actuation of platen 118. By means of Geneva 92 and the interconnecting drives to driven rollers 64, 69 and 72 and take-up spindle 104, these elements are intermittently and synchronously driven, said Geneva also being operatively connected to motor 31. The illustrated embodiment of the invention provides, therefore, an apparatus in which small pieces of film are successively and readily removed from and inserted into appropriate receptacles and are moved into and through the exposure station without handling; in which exact increments of a light-sensitive material are moved into the exposure station with the element to be printed; and in which each element is inverted before insertion into the receiving receptacle for retaining the same approach aspect relative to each other as they did when inserted in the supply receptacle.

Since many modifications of the invention will be apparent to those skilled in the art, the invention is not to be limited to the disclosure but is defined by the appended claims.

Having now particularly described my invention, what I desire to secure by Letters Patent of the United States and what I claim is:

1. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means associated with said supply station for removing said elements from said supply station and for positioning said elements on said carrier with respect to said apertures, a light source aligned with said exposure station, means for advancing equal lengths of said light-sensitive material into said exposure station, means operatively connected to said drive means for intermittently moving said advancing means during the interval of movement of said carrier, means for clamping the element moved into said exposure station and said light-sensitive material together during exposure of the latter by said light source, means arranged between said carrier and said receiving station and provided with a plurality of apertures over which said elements are positioned for movement to said receiving station and for inverting each of said elements during movement thereof, means operatively connected to said drive means for imparting a synchronous intermittent movement to said carrier and said inverting means, intermittently operable means associated with said carrier and said inverting means for removing one of said elements from said carrier and positioning said same element on said inverting means and simultaneously inserting one of said elements on said inverting means into said receiving station, and control means operatively connected to said drive means for actuating said light source, clamping means and operable means in proper timed and sequential relation during the interval said carrier and inverting means are stationary.

2. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiver station, intermittently operable means associated with said supply station for removing said elements from said supply station and for positioning said elements on said carrier with respect to said apertures, a light source aligned with said exposure station, means for advancing equal lengths of said light-sensitive material into said exposure station, means operatively connected to said drive means for intermittently moving said advancing means during the interval of movement of said carrier, means for clamping the element moved into said exposure station and said light-sensitive material together during exposure of the latter by said light source, an intermittently rotatable member arranged between said carrier and said receiving station and provided with a plurality of apertures over which said elements are positioned for movement from said carrier to said receiving station and for inverting each of said elements during movement thereof, one of said apertures in said carrier and apertures in said inverting means being aligned with said receiving station during each stationary interval thereof, means operatively connected to said drive means for imparting a synchronous intermittent movement to said carrier and said inverting means, means associated with said carrier and said inverting means for movement through said aligned apertures to remove one of said elements from said carrier and positioning said same element on said inverting means and simultaneously inserting one of said elements on said inverting means into said receiving station, and control means operatively connected to said drive means for actuating said light source, clamping means and operable means in proper timed and sequential relation during the interval said carrier and inverting means are stationary.

3. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means associated with said supply station for removing said elements from said supply station and for positioning said elements on said carrier with respect to said apertures, a light source aligned with said exposure station, means for advancing equal lengths of said light-sensitive material into said exposure station, means operatively connected to said drive means for intermittently moving said advancing means during the interval of movement of said carrier, means for clamping the element moved into said exposure station and said light-sensitive material together during exposure of the latter by said light source, a hollow polygonal drum having an even number of sides, each side thereof being provided with an aperture over which one of said elements is positioned for intermittent movement from said carrier to said receiving station and for inverting said element before insertion thereof into said receiving station and one of said apertures in said carrier and said drum being aligned with an opposed aperture in said drum and said receiving station during each stationary interval thereof, means operatively connected to said drive means for imparting a synchronous intermittent movement to said carrier and said inverting means, means associated with said carrier and said inverting means for movement through said aligned apertures to remove one of said elements from said carrier and positioning said same element on said inverting means and simultaneously inserting one of said elements on said inverting means into said receiving station, and control means operatively connected to said drive means for actuating said light source, clamping means and operable means in proper timed and sequential relation during the interval said carrier and drum are stationary.

4. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means associated with said supply station for removing said elements from said supply station and for positioning said elements on said carrier with respect to said apertures, a light source aligned with said exposure station, means for advancing equal elengths of said light-sensitive material into said exposure station, means operatively connected to said drive means for intermittently moving said advancing means during the interval of movement of said carrier, means for clamping the element moved into said exposure station and said light-sensitive material together during exposure of the latter by said light source, a hollow polygonal drum having an even number of sides, each side thereof being provided with an aperture over which one of said elements is positioned for intermittent movement from said carrier to said receiving station and for inverting said element before insertion thereof into said receiving station and one of said apertures in said carrier and said drum being aligned with an opposed aperture in said drum and said receiving station during each stationary interval thereof, means operatively connected to said drive means for imparting a synchronous intermittent movement to said carrier and said inverting means, a reciprocating member having a portion thereof arranged with respect to said carrier and another portion arranged with respect to said drum for movement through the aligned apertures to move one of said elements on said carrier into said drum and simultaneously to move the inverted element on said drum into said receiving station, and actuating means operatively connected to said drive means for controlling and rendering said light source, clamping means, and reciprocating member operable in proper timed and sequential relation only during the interval said carrier and drum are stationary.

5. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means operatively connected to said drive means and associated with said supply station for removing said elements from said supply station and for positioning said elements on said carrier with respect to said apertures, a light source aligned with said exposure station, means adjacent said exposure station for advancing predetermined equal lengths of said light-sensitive material into said exposure station, means arranged on each side of said exposure station and beyond said advancing means on the one side thereof for advancing said light-sensitive material in equal lengths greater and less than said predetermined length for reducing the load on said first-mentioned advancing means, means arranged between said carrier and said receiving station and provided with a plurality of apertures over which said elements are positioned for movement to said receiving station and for inverting each of said elements during movement thereof, means operatively connected to said drive means for imparting a synchronous intermittent movement to said carrier and said inverting means, intermittently operable means associated with said carrier and said inverting means for removing one of said elements from said carrier and positioning said same element on said inverting means and simultaneously inserting one of said elements on said inverting means into said receiving station, means operatively connected to said drive means for imparting a synchronous intermittent movement to each of said advancing means during the interval of and in synchronism with the movement of said carrier and inverting means, and control means operatively connected to said drive means for actuating said light source and operable means in proper timed and sequential relation during the interval said carrier and inverting means are stationary.

6. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means operatively connected to said drive means and associated with said supply station for removing said elements from said supply station and for positioning said elements on said carrier with respect to said apertures, a light source aligned with said exposure station, a drive roller adjacent said exposure station for advancing predetermined and equal lengths of said light-sensitive material into said exposure station, a drive roller on each side of said exposure station and beyond said first-mentioned drive roller on the one side thereof for withdrawing said light-sensitive material in equal lengths less than said predetermined length with respect to said first-mentioned drive roller and advancing said light-sensitive material in equal lengths greater than said predetermined lengths toward said exposure station and said first-mentioned drive roller for reducing the load imposed thereon by said light-sensitive material, means arranged between said carrier and said receiving station and provided with a plurality of apertures over which said elements are positioned for movement to said receiving station and for inverting each of said elements during movement thereof, means operatively connected to said drive means for imparting a synchronous intermittent movement to said carrier and said inverting means, intermittently operable means associated with said carrier and said inverting means for removing one of said elements from said carrier and positioning said same element on said inverting means and simultaneously inserting one of said elements on said inverting means into said receiving station, means operatively connected to said drive means for imparting a synchronous intermittent movement to each of said drive rollers during the interval of and in synchronism with the movement of said carrier and inserting means, and control means operatively connected to said drive means for actuating said light source and operable means in proper timed and sequential relation during the interval said carrier and inverting means are stationary.

7. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means operatively connected to said drive means and associated with said supply station for removing said elements from said supply station and for positioning said elements on said carrier with respect to said apertures, a light source aligned with said exposure station, a drive roller adjacent said exposure station for advancing predetermined and equal lengths of said light-sensitive material into said exposure station, a drive roller on each side of said exposure station and beyond said first-mentioned drive roller on the one side thereof for withdrawing said light-sensitive material in equal lengths less than said predetermined length with respect to said first-mentioned drive roller and advancing said light-sensitive material in equal lengths greater than said predetermined lengths to said first-mentioned drive roller for reducing the load imposed thereon by said light-sensitive material, a drum member rotatably mounted between said carrier and said receiving station and provided about the periphery thereof with a plurality of apertures over which said elements are positioned for intermittent movement from said carrier to said receiving station and for inverting each of said elements during movement thereof between said carrier and receiving station, one of said apertures in said carrier being aligned with one of said apertures in said inverting means and another aperture in said inverting means being aligned with said receiving station during each stationary interval thereof, means operatively connected to said drive means for imparting a synchronous intermittent movement to said carrier and said drum, means operatively connected to said drive means for imparting a synchronous intermittent movement to each of said drive rollers during the interval of and in synchronism with the movement of said carrier and drum, reciprocating means having a portion thereof arranged with respect to said carried and another portion arranged with respect to said drum for movement through the aligned apertures therein to move one of said elements on said carrier onto said drum and the inverted element on said drum into said receiving station, and control means operatively connected to said drive means for actuating said light source, and reciprocating means in proper timed and sequential relation during the interval said carrier and drum are stationary.

8. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means operatively connected to said drive means and associated with said supply station for removing said elements from said supply station and for positioning said elements on said carrier with respect to said apertures, a light source aligned with said exposure station, a drive roller adjacent said exposure station for advancing predetermined lengths of said light-sensitive material into said exposure station, a pivotally mounted roller beyond said drive roller for forming a supply loop of said light-sensitive material, a drive roller for supplying equal lengths of said light-sensitive material greater than said predetermined length to said supply loop, a pivotally mounted roller beyond said exposure station for forming a take-up loop of said light-sensitive material, a drive roller for withdrawing equal lengths of said light-sensitive material less than said predetermined length from said take-up loop, said loops reducing the load imposed on said first-mentioned drive roller, a drum member rotatably mounted between said carrier and said receiving station and provided about the periphery thereof with a plurality of apertures over which said elements are positioned for intermittent movement from said carrier to said receiving station and for inverting each of said elements during movement thereof between said carrier and receiving station, one of said apertures in said carrier being aligned with one of said apertures in said inverting means and another aperture in said inverting means being aligned with said receiving station during each stationary interval thereof, means operatively connected to said drive means for imparting a synchronous intermittent movement to said carrier and said drum, means operatively connected to said drive means for imparting a synchronous intermittent movement to each of said drive rollers during the interval of and in synchronism with the movement of said carrier and drum, reciprocating means having a portion thereof arranged with respect to said carrier and another portion arranged with respect to said drum for movement through the aligned apertures therein to move one of said elements on said carrier onto said drum and the inverted element on said drum into said receiving station, and control means operatively connected to said drive means for actuating said light source, and reciprocating means in proper timed and sequential relation during the interval said carrier and drum are stationary.

9. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means operatively connected to said drive means and associated with said supply station for removing said elements from said supply station and for positioning said elements on said carrier with respect to said apertures, a light source aligned with said exposure station, a drive roller adjacent said exposure station for advancing predetermined lengths of said light-sensitive material into said exposure station, a pivotally mounted roller beyond said drive roller for forming a supply loop of said light-sensitive material, a drive roller for supplying equal lengths of said light-sensitive material greater than said predetermined length to said supply loop, a pivotally mounted roller beyond said exposure station and said first-mentioned drive roller for forming a take-up loop of said light-sensitive material, a drive roller for withdrawing equal lengths of said light-sensitive material less than said predetermined length from said take-up loop, said loops reducing the load imposed on said first-mentioned drive roller, a hollow polygonal drum having an even number of sides, each side thereof being provided with an aperture over which one of said elements is positioned for intermittent movement from said carrier to said receiving station and for inverting said element before insertion thereof into said receiving station and one of said apertures in said carrier and said receiving station being aligned with opposed apertures in said drum during each stationary interval thereof, means operatively connected to said drive means for imparting a synchronous intermittent movement to said carrier and said drum, means operatively connected to said drive means for imparting a synchronous intermittent movement to each of said drive rollers during the interval of and in synchronism with the movement of said carrier and drum, intermittently operable means arranged with respect to said carrier and drum for movement through the aligned apertures thereof to move one of said elements on said carrier onto said drum and the inverted element on said drum into said receiving station during the interval said carrier and drum are stationary, and control means operatively connected to said drive means for actuating said light source and intermittently operable means during the interval said carrier and drum are stationary.

10. In apparatus of the type described for printing discrete photographic elements on a continuous strip of light-sensitive material, the combination comprising a supply station for said elements, a receiving station for said elements, an exposure station arranged between said supply station and said receiving station, a drive means, a carrier provided with a plurality of apertures over which said elements are positioned for movement from said supply station, into said exposure station and to said receiving station, intermittently operable means operatively connected to said drive means and associated with said supply station for removing said elements from said supply station and for positioning said elements on said carrier with respect to said apertures, a light source aligned with said exposure station, a drive roller adjacent said exposure station for advancing predetermined lengths of said light-sensitive material into said exposure station, a pivotally mounted roller beyond said drive roller for forming a supply loop of said light-sensitive material, a drive roller for supplying equal lengths of said light-sensitive material greater than said predetermined length of said supply loop, a pivotally mounted roller beyond said exposure station and said first-mentioned drive roller for forming a take-up loop of said light-sensitive material less than said predetermined length from said take-up loop, said loops reducing the load imposed on said first-mentioned drive roller, a hollow polygonal drum having an even number of sides, each side thereof being provided with an aperture over which one of said elements is positioned for intermittent movement from said carrier to said receiving station and for inverting said element before insertion thereof into said receiving station and one of said apertures in said carrier and said receiving station being aligned with opposed apertures in said drum during each stationary interval thereof, means operatively connected to said drive means for imparting a synchronous intermittent movement to said carrier and said drum, means operatively connected to said drive means for imparting a synchronous intermittent movement to each of said drive rollers during the interval of and in synchronism with the movement of said carrier and drum, a reciprocating plunger having a portion thereof arranged with respect to said carrier and another portion arranged with respect to said drum for movement through the aligned apertures to move one of said elements on said carrier onto said drum and the inverted element on said drum into said receiving station, and control means operatively connected to said drive means for actuating said light source and reciprocating means in proper timed and sequential relation during the interval said carrier and drum are stationary.

References Cited in the file of this patent

UNITED STATES PATENTS

| | | |
|---|---|---|
| 757,737 | Green et al. | Apr. 19, 1904 |
| 1,503,507 | Koch | Aug. 5, 1924 |
| 1,745,956 | Schlesinger | Feb. 4, 1930 |
| 2,227,110 | Stuart | Dec. 31, 1940 |
| 2,649,303 | Fuller | Aug. 18, 1953 |
| 2,654,300 | Baker | Oct. 6, 1953 |

FOREIGN PATENTS

| | | |
|---|---|---|
| 550,974 | Germany | May 24, 1932 |